Nov. 23, 1965   L. KUNZMANN   3,218,795
WATCH BAND
Filed June 25, 1963

INVENTOR
Ludwig Kunzmann by
Michael S. Striker
Atty 3,218,795
WATCH BAND
Ludwig Kunzmann, Pforzheim, Germany, assignor to Rodi & Wienenberger Aktiengesellschaft, Pforzheim, Germany
Filed June 25, 1963, Ser. No. 290,450
Claims priority, application Germany, July 28, 1962, R 24,365
12 Claims. (Cl. 59—80)

The present invention relates to a flexible band, and more particularly to a flexible band of the type used for making bracelets.

It is the object of the invention to connect a series of links of simple configuration in such a manner that the band formed by the interconnected links is bendable in two planes perpendicular to each other. Another object is to compose a flexible band of a series of rigid links.

Another object of the invention is to interconnect a series of links in a manner which permits rapid mass manufacture at low cost.

Another object of the present invention is to connect the links of a flexible band in such a manner that the connection can be interrupted by simple manual operation so that pieces of the band having a desired length can be easily obtained for the purpose of fitting a bracelet to the wrist of a particular person.

Another object of the invention is to provide a flexible band of pleasing appearance which has high utility as a bracelet due to its great flexibility. With these objects in view, one embodiment of the invention is a flexible band comprising a series of links arranged in a row extending in the longitudinal direction of the band. Each link includes a main portion, preferably a central angular portion, formed with openings therethrough, and two connecting portions extending at angles to the longitudinal direction of the band and projecting into the openings of the central portion of at least one other link. In this manner, the connecting portions of each link form a flexible connection with one or several links directly preceding it whereby all links are connected to each other to form a flexible band.

In the preferred embodiment of the invention, the central portion of each link is angular and has slightly curved legs of rectangular cross section. The legs have rectangular openings adjacent the ends thereof. The openings of adjacent links are offset to each other so that portions of each opening register with portions of the openings of the two links located before and behind the respective link in said direction. The connecting portions of each link project through the registering portions of the openings of the two links preceding the respective link, and have a corresponding link.

The novel features which are considered as characteristic for the invention are set forth in particular in the appended claims. The invention itself, however, both as to its construction and its method of operation together with additional objects and advantages thereof, will be best understood from the following description of specific embodiments when read in connection with the accompanying drawing, in which:

Figure 1:
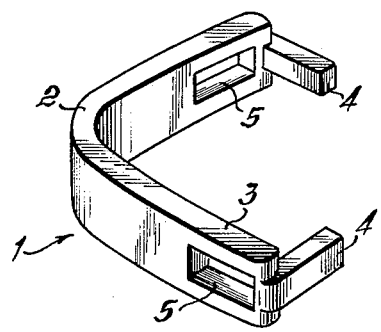
FIG. 1 is perspective view of a single link.

Referring now to the drawing, the band is constructed of a series of identical links 1. Each link has an angular main or central portion 2 with two end portions, e.g., two symmetrical legs 3 and an apex located in the longitudinal line of symmetry of the band. The cross section of the central portion 2 is rectangular, and the height of the central portion 2 is greater than its thickness.

Elongated openings or slots of rectangular configuration are formed adjacent the ends of the legs 3.

Connecting portions 4 of rectangular cross section project from the ends of legs 3 at an angle to the longitudinal direction of the band. The thickness of the connecting portions 4 corresponds substantially to the thickness of the central portion as best seen in FIG. 3, but the height of portion 4 is only a fraction of the height of the center portion 2 and corresponds to the height of the rectangular openings 5.

Figure 3:
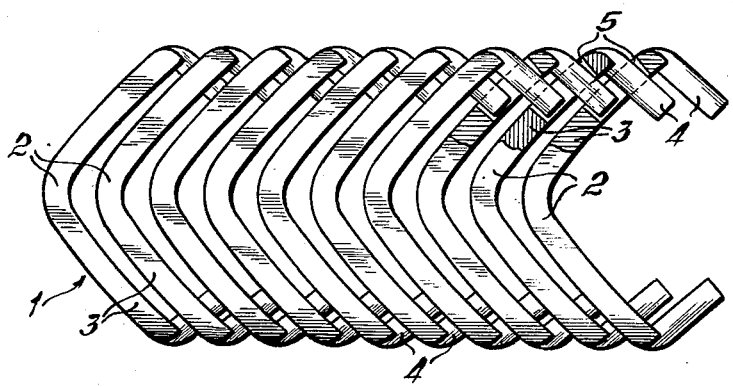
FIG. 3 is a plan view, partially in section, of the band illustrated in FIG. 2.

The length of each connecting portion corresponds to the thickness of two central portions, increased by the distances of adjacent central portions, as best seen in FIG. 3.

Each opening 5 has a transverse width greater than its height, and slightly greater than the transverse thickness of two adjacent connecting portions 4 so that two connecting portions can be placed in each opening 5 with play.

Corresponding openings of adjacent links are offset to each other, so that one-half of each opening registers with one half of the opening of the preceding link, and the other half of each opening registers with a corresponding half of the following link. The connecting portions 4 are consequently located in registering portions or halves of openings 5.

The height of connecting portions 4 is less than the height of openings 5 so that due to this play, a relative up and down movement of the links is possible. This play also permits a bending of the band about a horizontal axis, so that the band can be flexed to a position encircling the wrist of a person.

The play between two connecting portions 4 in each opening 5, permits a limited turning of each link relative to the adjacent links about a vertical axis. As a result, the band is flexible about a vertical axis, or in longitudinal direction of the arm of a person wearing a bracelet formed of the flexible band of the invention.

Figure 2:
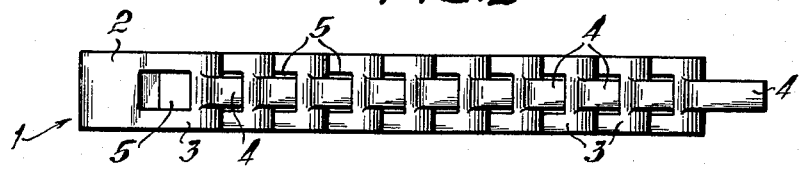
FIG. 2 is a side elevation of a piece of a flexible band according to one embodiment of the invention.

The top and bottom faces of the central portion 2 are parallel to the top and bottom faces of the connecting portions 4 so that the central and connecting portions of each link may be considered to be located in a common plane. The top and bottom faces of all links are flush, as best seen in FIG. 2, and the ends of the angular central portions 2 of the links form the lateral edges of the band.

The construction of the present invention can be modified by providing openings of such a transverse width as to receive only a single connecting portion of the respective adjacent link. The corresponding connecting portions have such a length as to project only through the opening of the respective adjacent link.

In another modification of the invention, the openings have such a transverse width as to receive three connecting portions, which are correspondingly constructed of such a length as to pass through registering portions of the openings of three adjacent links.

The band is manufactured by stamping the links and by bending the connecting portions into the openings of the respective preceding link. When the connection shown in FIG. 3 is formed, a pull in the longitudinal direction will cause an abutment of the connecting portions 4 on the side walls of openings 5, and since the connecting portions extend at angles to the longitudinal direction of the band and of the pull, the links cannot separate. On the other hand, when the links are pushed together, the nesting center portions 2 will abut each other eliminating the play between the central portions in the illustrated position. Therefore, the length of the band is variable within a small range whereby the flexibility of the band is further improved.

It will be understood that each of the elements described above or two or more together, may also find a useful application in other types of flexible bands differing from the types described above.

While the invention has been illustrated and described as embodied in a flexible band composed of links having angular central portions and slanted connecting portions, it is not intended to be limited to the details shown, since various modifications and structural changes may be made without departing in any way from the spirit of the present invention.

Without further analysis the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed and desired to be secured by Letters Patent is:

1. A flexible band comprising a series of links consecutively arranged in a row extending in the longitudinal direction of the band, each link including a main portion having end portions extending at an acute angle to each other and formed with openings therethrough, with the nearest edges of the respective openings being spaced apart by a predetermined distance, and two connecting portions on said end portions of said main portion converging at an acute angle toward each other in a direction away from said main portion, said connecting portions having respective free ends spaced apart from each other by a distance smaller than said predetermined distance and projecting with said free ends into said openings of the main portion of at least one other consecutive link so that as a result of said connecting portions converging at an acute angle toward each other in a direction away from said main portion, a permanent but flexible connection is established between said consecutively arranged links despite said end portions of said main portion forming an acute angle with each other.

2. A flexible band comprising a series of links consecutively arranged in a row extending in the longitudinal direction of the band, each link including a central portion having ends located on opposite sides of the band, said ends extending at an acute angle to each other and being formed with openings therethrough inwardly of said ends with the nearest edges of the respective openings being spaced apart by a predetermined distance, and two connecting portions on said ends of said central portion converging at an acute angle toward each other and in a direction away from said central portion, said connecting portions having respective free ends spaced apart from each other by a distance smaller than said predetermined distance and projecting into said openings of at least one other consecutive link so that as a result of said connecting portions converging at an acute angle toward each other in a direction away from said central portion, a permanent but flexible connection is established between said consecutively arranged links despite said ends of said central portion forming an acute angle with each other.

3. A flexible band comprising a series of links arranged in a row extending in the longitudinal direction of the band, each link including a main portion formed with a pair of openings therethrough, said pairs of openings of adjacent links being offset relative to each other so that portions of each opening register with portions of the openings of the two links located before and behind the respective link in said direction, and two connecting portions extending at angles to said longitudinal direction and projecting into the registering portions of said openings of the two links preceding the respective link in said direction to form a flexible connection with the same.

4. A flexible band comprising a series of links consecutively arranged in a row extending in longitudinal direction of the band, each link including a central portion having ends located on opposite sides of the band and extending at an acute angle to each other, said ends being formed with two openings therethrough located adjacent said ends, with the nearest edges of the respective openings being spaced apart by a predetermined distance, and two connecting portions on said ends of said central portion, said connecting portions and said central portion being located in a common plane, and said connecting portions converging at an acute angle toward each other in a direction away from said main portion, said connecting portions having respective free ends spaced apart from each other by a distance smaller than said predetermined distance and extending into said openings of at least one other consecutive link adjacent the respective link, each connecting portion having play in the respective opening and forming a flexible connection with at least said adjacent link so that as a result of said connecting portions converging at an acute angle toward each other in a direction away from said central portion, a permanent but flexible connection is established between said consecutively arranged links despite said ends of said central portion forming an acute angle with each other.

5. A flexible band comprising a series of links arranged in a row extending in the longitudinal direction of the band, each link including a central portion having ends located on opposite sides of the band and being formed with two openings therethrough located adjacent said ends, said openings of adjacent links being offset relative to each other so that portions of each opening register with portions of the openings of the adjacent links located before and behind the respective link in said direction, and two connecting portions, said connecting portions and said central portion being located in a common plane, and said connecting portions projecting inwardly from said ends at angles to said longitudinal direction and through said registering portions of said openings of the two links following the respective link in said direction and having a length corresponding to the thickness of two central portions, each projection having play in the respective openings and forming a flexible connection with said two following links whereby all said links form a flexible band.

6. A flexible band comprising a series of links consecutively arranged in a row extending in the longitudinal direction of the band, each link including an angular main portion having legs with ends located on opposite sides of the band and extending at an acute angle to each other, said legs having rectangular cross sections and being formed with rectangular openings therethrough inwardly of said ends with the nearest edges of the respective openings being spaced apart by a predetermined distance, and two connecting portions on said ends of said main portion, said connecting portions having rectangular cross sections and converging at an acute angle toward each other in a direction away from said main portion, said connecting portions having respective free ends spaced apart from each other by a distance smaller than said predetermined distance and extending into said rectangular openings of at least one other consecutive link so that as a result of said connecting portions converging at an acute angle toward each other in a direction away from said main portion, a permanent but flexible connection is established between said consecutively arranged links despite said ends of said main portion forming an acute angle with each other.

7. A flexible band comprising a series of links consecutively arranged in a row extending in the longitudinal direction of the band, each link including a main portion having a rectangular cross section and having ends located on opposite sides of the band, said ends extending at an acute angle to each other and being formed with two rectangular openings therethrough located adjacent said ends, with the nearest edges of the respective openings being spaced apart by a predetermined distance, and two connecting portions on said ends of said main portion, said connecting portions having rectangular cross sections and a lesser height than said main portion, said connecting portions and said main portion being located in a common plane, and said connecting portions converging at an acute angle toward each other in a direction away from said main portion, said connecting portions being respective free ends spaced apart from each other by a distance smaller than said predetermined distance and projecting through said openings of at least one other consecutive link adjacent the respective link, each projection having play in the respective openings and forming a flexible connection with at least said adjacent consecutive link so that as a result of said connecting portions converging at an acute angle toward each other in a direction away from said main portion, a permanent but flexible connection is established between said consecutively arranged links despite said ends of said main portion forming an acute angle with each other.

8. A flexible band comprising a series of links arranged in a row extending in the longitudinal direction of the band, each link including a central portion having a rectangular cross section located on opposite sides of the band and being formed with two rectangular openings therethrough located adjacent said ends, said openings of adjacent links being offset relative to each other so that portions of each opening register with portions of the openings of the adjacent links located before and behind the respective link in said direction, and two connecting portions having rectangular cross sections and a lesser height than said central portion, said connecting portions and said central portion being located in a common plane, and said connecting portions projecting inwardly from said ends at angles to said longitudinal direction and through said registering portions of said openings of the two links following the respective link in said direction and having a length corresponding to the thickness of two central portions, each projection having play in the respective openings and forming a flexible connection with said two following links whereby all said links form a flexible band.

9. A flexible band comprising a series of links arranged in a row extending in the longitudinal direction of the band, each link including an angular central portion having the apex thereof located at the longitudinal line of symmetry of the band and having ends located on opposite sides of the band and being formed with two openings therethrough located adjacent said ends, said openings of adjacent links being offset relative to each other so that portions of each opening register with portions of the openings of the adjacent links located before and behind the respective link in said direction, and two connecting portions having rectangular cross sections and a lesser height than said central portion, said connecting portions and said central portion being located in a common plane, and said connecting portions projecting inwardly from said ends at angles to said longitudinal direction and through said registering portions of said openings of the two links following the respective link in said direction and having a length corresponding to the thickness of two central portions, each projection having play in the respective openings and forming a flexible connection with said two following links to hold said angular central portions of said links in nesting positions whereby all said links form a flexible band.

10. A flexible band comprising a series of links consecutively arranged in a row extending in the longitudinal direction of the band, each link including an angular main portion having legs extending at an acute angle to the longitudinal direction of the band and to each other, said legs terminating in ends located on opposite sides of the band and being formed with openings therethrough inwardly of said ends, with the nearest edges of the respective openings being spaced apart by a predetermined distance and two connecting portions on said ends of said legs of said main portion, said connecting portion converging at an acute angle toward each other in a direction away from said main portion, said connecting portions being respective free ends spaced apart from each other by a distance smaller than said predetermined distance and converging at an acute angle toward each other extending at right angles to said legs into said openings of at least one other consecutive link so that as a result of said connecting portions converging at an acute angle toward each other in a direction away from said main portion, a permanent but flexible connection is established between said consecutively arranged links despite said ends of said main portion forming an acute angle with each other.

11. For use in a flexible band, a link having a plane of symmetry and having a central portion of rectangular cross-section located on opposite sides of said plane of symmetry, said central portion being formed with opposite end portions extending at an acute angle to each other and having respective ends, and said end portions being formed with openings therethrough inwardly of said ends, the nearest edges of the respective openings being spaced apart by a predetermined distance, said links further having two connecting portions on the respective ends and converging from said respective ends at an acute angle in a direction toward each other and away from said central portion, said connecting portions having respective free ends spaced apart by a distance smaller than said predetermined distance so that as a result of said connecting portions converging at an acute angle toward each other in a direction away from said central portion, a permanent but flexible connection is established between said consecutively arranged links when said free ends of said connecting portions are received in the openings of a consecutively arranged identical link, despite said end portions of said central portion forming an acute angle with each other.

12 For use in a flexible band, a link having a plane of symmetry and having a substantially V-shaped central portion comprising a pair of legs located on opposite sides of said plane of symmetry, said legs being formed with opposite end portions extending at an acute angle to each other and having respective ends, and said end portions being formed with openings therethrough inwardly of said ends, the nearest edges of the respective openings being spaced apart by a predetermined distance, said links further having two connecting portions on the respetcive ends and converging from said respective ends at an acute angle toward each other and in a direction away from said central portion, said connecting portions having respective free ends spaced apart by a distance smaller than said predetermined distance so that as a result of said connecting portions converging at an acute angle toward each other in a direction away from said central portion, a permanent but flexible connection is established between said consecutively arranged links when said free ends of said connecting portions are received in the openings of a consecutively arranged identical link, despite said end portions of said central portion forming an acute angle with each other.

References Cited by the Examiner

UNITED STATES PATENTS 84,359  11/1868  Jung _____ 59—80

CHARLES W. LANHAM, *Primary Examiner.*

WILLIAM J. STEPHENSON, *Examiner.*